(12) United States Patent
Seo et al.

(10) Patent No.: US 12,189,527 B2
(45) Date of Patent: Jan. 7, 2025

(54) METHOD AND APPARATUS FOR MANAGING UNIFIED VIRTUAL MEMORY BY PREVENTING MIGRATION OF DEEP LEARNING MODEL'S WEIGHT FROM PROCESSOR MEMORY TO COPROCESSOR MEMORY

(71) Applicant: Samsung Electronics Co., Ltd., Suwon-si (KR)

(72) Inventors: Wonik Seo, Suwon-si (KR); Dong-uk Ryu, Suwon-si (KR); Sungduk Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/343,099

(22) Filed: Jun. 28, 2023

(65) Prior Publication Data

US 2024/0220407 A1 Jul. 4, 2024

(30) Foreign Application Priority Data

Dec. 28, 2022 (KR) ........................ 10-2022-0186915

(51) Int. Cl.
*G06F 12/08* (2016.01)
(52) U.S. Cl.
CPC .................... *G06F 12/08* (2013.01)
(58) Field of Classification Search
CPC ....................................................... G06F 12/08
See application file for complete search history.

(56) References Cited

U.S. PATENT DOCUMENTS

| | | | |
|---|---|---|---|
| 10,319,060 B2 | 6/2019 | Rao et al. | |
| 10,782,897 B2 | 9/2020 | Sekiyama et al. | |
| 2014/0223131 A1* | 8/2014 | Agarwal | G09G 5/39 711/165 |
| 2017/0109210 A1* | 4/2017 | Goossens | G06F 9/5044 |
| 2018/0314431 A1* | 11/2018 | Rashid | G06F 12/109 |
| 2021/0294646 A1* | 9/2021 | Hassaan | G06F 9/4881 |
| 2022/0197811 A1 | 6/2022 | Ganguly et al. | |
| 2022/0214825 A1 | 7/2022 | Ganguly et al. | |
| 2022/0327660 A1* | 10/2022 | Steadman | G06F 16/535 |

FOREIGN PATENT DOCUMENTS

KR 10-2015-0031293 A 3/2015

* cited by examiner

*Primary Examiner* — Chie Yew
(74) *Attorney, Agent, or Firm* — NSIP Law

(57) ABSTRACT

A method and apparatus for managing a unified virtual memory (UVM) are provided. The UVM is backed by a main processor memory and a coprocessor memory, and the method includes: checking properties of data blocks of the UVM used to execute a deep learning model; based on a first of the data blocks storing weight data of the deep learning model, storing the first data block in the main processor memory among the main processor memory and the coprocessor memory; and performing an operation of the deep learning model based on the first data block using a coprocessor while directly loading at least a portion of the first data block from the main processor memory into a cache memory of the coprocessor without migration of the first data block from the main processor memory to the coprocessor memory.

20 Claims, 10 Drawing Sheets

METHOD AND APPARATUS FOR MANAGING UNIFIED VIRTUAL MEMORY BY PREVENTING MIGRATION OF DEEP LEARNING MODEL'S WEIGHT FROM PROCESSOR MEMORY TO COPROCESSOR MEMORY

CROSS-REFERENCE TO RELATED APPLICATIONS

This application claims the benefit under 35 USC § 119(a) of Korean Patent Application No. 10-2022-0186915, filed on Dec. 28, 2022, in the Korean Intellectual Property Office, the entire disclosure of which is incorporated herein by reference for all purposes.

BACKGROUND

1. Field

The following description relates to a method and apparatus for managing a unified virtual memory (UVM).

2. Description of Related Art

UVM technology may provide a single unified address space for simultaneous use by multiple processing units such as a central processing unit (CPU) and a graphic processing unit (GPU). A processing unit such as a GPU may process deep neural network (DNN) models that require more memory than is available from a physical memory of the GPU through a virtual address space of a UVM. A user may view a UVM as a memory that provides a large address space and may use the UVM without directly considering complex processes such as data movement between multiple processing units.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of managing a unified virtual memory (UVM) that is backed by a main processor memory and a coprocessor memory includes: checking properties of data blocks of the UVM used to execute a deep learning model; based on a first of the data blocks storing weight data of the deep learning model, storing the first data block in the main processor memory among the main processor memory and the coprocessor memory; and performing an operation of the deep learning model based on the first data block using a coprocessor while directly loading at least a portion of the first data block from the main processor memory into a cache memory of the coprocessor without migration of the first data block from the main processor memory to the coprocessor memory.

The method may further include: based on the first data block storing the weight data of the deep learning model, designating a preferred backing memory of the first data block to be the main processor memory.

Based on backing memory of the first data block being designated as the main processor memory, the migration of the first data block to the coprocessor memory may be inhibited or prevented.

The method may further include: in a forward propagation stage of the deep learning model, executing a first layer of the deep learning model to determine a second data block of the UVM storing an output of the first layer; prefetching the second data block into the main processor memory; based on the second data block being prefetched into the main processor memory, in a backward propagation stage of the deep learning model, prefetching the second data block from the main processor memory into the coprocessor memory; and updating a parameter of the first layer using the second data block.

The method may further include determining whether to prefetch the second data block into the main processor memory based on an output prefetch condition.

The output prefetch condition may include a condition of a position of the first layer in the deep learning model a condition of usage of the coprocessor memory in a learning process of the deep learning model.

The prefetching of the second data block may be performed at least partly based on a prediction of an oversubscription condition occurring with respect to the coprocessor memory.

The storing of the first data block in the main processor memory and the performing of the operation of the deep learning model while directly loading the at least a portion of the first data block into the cache memory from the coprocessor memory may be performed in response to an occurrence of oversubscription of the coprocessor memory being predicted.

The main processor may include a central processing unit (CPU) and the coprocessor may include a graphic processing unit (GPU).

The checking of the properties of the data blocks may be performed by an extended unified memory (EUM) runtime provided separately from a UVM runtime and UVM driver that manage and provide the UVM.

In another general aspect, an electronic device includes: one or more processors; and a memory storing instructions configured to cause the one or more processors to: check properties of data blocks used to execute a deep learning model, the data blocks including blocks of a unified virtual memory (UVM) backed by a main processor memory and by a coprocessor memory; in response to a first of the data blocks storing weight data of the deep learning model, store the first data block in the main processor memory among the main processor memory and the coprocessor memory; and perform an operation of the deep learning model based on the first data block using a coprocessor while directly loading at least a portion of the first data block from the main processor memory into a cache memory of the coprocessor, without migration of the first data block of the main processor memory to the coprocessor memory.

The instructions may be further configured to cause the one or more processors to: based on the first data block storing the weight data of the deep learning model, designate a preferred backing memory of the first data block to the main processor memory.

Based on the backing memory of the first data block being designated as the main processor memory, the migration of the first data block to the coprocessor memory may be inhibited or prevented.

The instructions may be further configured to cause the one or more processors to: in a forward propagation stage of the deep learning model, execute a first layer of the deep learning model to determine a second data block of the UVM storing an output of the first layer; prefetch the second data block into the main processor memory; based on the second data block being prefetched into the main processor memory, in a backward propagation stage of the deep learning model, prefetch the second data block from the main processor memory into the coprocessor memory; and update a parameter of the first layer using the second data block.

The instructions may be further configured to cause the one or more processors to: determine whether to prefetch the second data block into the main processor memory based on an output prefetch condition, wherein the output prefetch condition includes a condition of a position of the first layer in the deep learning model and a condition of usage of the coprocessor memory in a learning process of the deep learning model.

The prefetching of the second data block may be performed at least partly based on a prediction of an oversubscription of the coprocessor memory.

The instructions may be further configured to cause the one or more processors to: in response to an occurrence of oversubscription of the coprocessor memory being predicted, store the first data block in the main processor memory and perform the operation of the deep learning model by directly loading the at least a portion of the first data block into the cache memory of the coprocessor.

The main processor may include a central processing unit (CPU) and the coprocessor may include a graphic processing unit (GPU).

In another general aspect, a method includes: executing a unified virtual memory (UVM) system that provides a UVM including a continuous virtual memory address space backed by a main processor memory and a coprocessor memory, wherein UVM data blocks allocated from the UVM store are used for performing an operation of a neural network; determining pinning properties of the respective UVM data blocks based on the performing of the operation of the neural network; and while performing the operation of the neural network, based on the pinning properties of the UVM data blocks, pinning UVM data blocks to the main processor memory and the coprocessor memory to prevent the pinned UVM data blocks, while pinned, from being migrated from the main processor memory and the coprocessor memory.

The UVM system may include a runtime component executing in user space and a driver component executing in kernel space, and the runtime component may perform the determining of the pinning properties, and the driver component may perform the pinning.

Other features and aspects will be apparent from the following detailed description, the drawings, and the claims.

DETAILED DESCRIPTION

Figure 1:
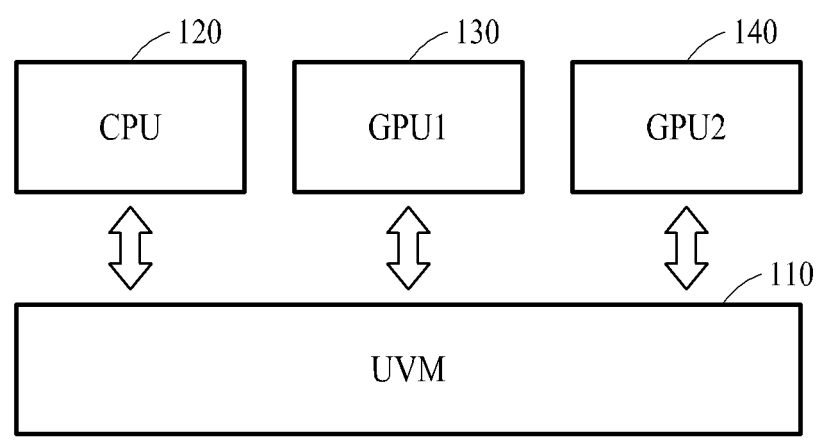
FIG. 1 illustrates an example connection structure of multiple processing units and a unified virtual memory (UVM), according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Hereinafter, the examples will be described in detail with reference to the accompanying drawings. When describing the examples with reference to the accompanying drawings, like reference numerals refer to like components and a repeated description related thereto is omitted.

FIG. 1 illustrates an example connection structure of multiple processing units and a unified virtual memory (UVM), according to one or more embodiments. A unified virtual memory (UVM) 110 may provide a single address space to multiple processors such as a central processing unit (CPU) 120, a first graphic processing unit (GPU) 130, and a second GPU 140. The UVM 110 may be based on the NIVIDIA™ UVM architecture, the Linux Heterogeneous Memory Management (HMM) system, or the like, although the UVM 110 is not limited thereto (as used herein, "UVM" refers implementations of the aforementioned memory systems as well similar virtual memory systems). The following description of GPUs may also be applied to other types of processors, such as a neural processing unit (NPU). A virtual address space backed by different shared physical memories such as the physical memory of the CPU 120 (e.g., host memory) and the physical memory of the first GPU 130 may be provided by the UVM 110. Data blocks of the UVM 110 may have addresses in the same provided by the UVM 110. An operation of a deep neural network (DNN) model that requires more memory than any individual physical memory (e.g., the physical memory of the first GPU 130) may be realized by the UVM 110. A user may view the UVM 110 as a memory (virtual) that uses one large address space, and may be provided with the convenience of not having to directly consider complex processes such as data movement between different processors (e.g., the CPU 120 and the first GPU 130).

When a DNN model is trained while residing in the UVM 110, training may be easily performed without separate data dividing work such as parallel distributed training. In addition, the UVM 110 may have excellent scalability. Whenever a new DNN model appears, no effort (e.g., recoding) is required to partition the DNN model for parallel processing or the like. For framework-based distributed technology, a multi-GPU environment may be used. The UVM 110 may provide an environment suitable for performing DNN model training on a single server by providing a very large virtual address space including at least a CPU memory, even in a single GPU environment. In addition, the UVM 110 may provide excellent usability. The UVM (110) may operate for various applications using the UVM 110 as well as an application for learning of the DNN model.

Figure 2:
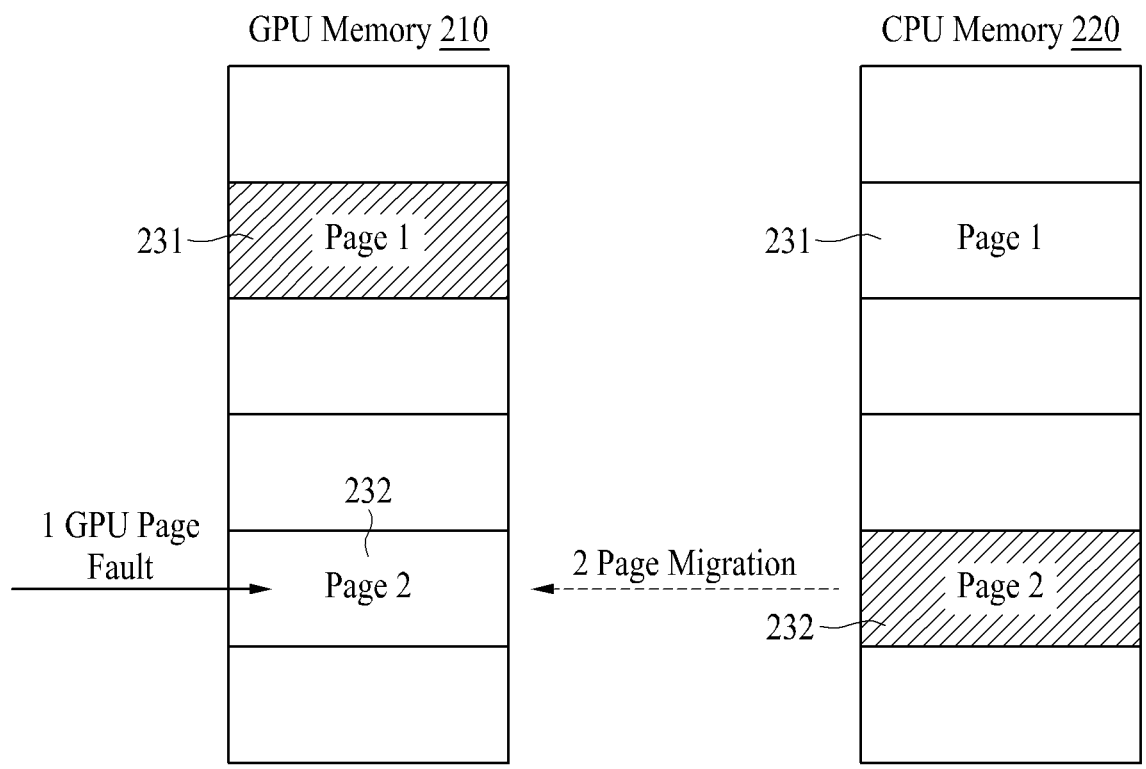
FIG. 2 illustrates an example of page migration according to a page fault, according to one or more embodiments.

FIG. 2 illustrates an example of page migration according to a page fault. A UVM may perform page accesses through on-demand paging by faults. For example, a page 1 231 may be stored in a GPU memory 210, a page 2 232 may be stored in a CPU memory 220, and both the GPU and the CPU may use the page 1 231 and the page 2 232 through the UVM. The GPU memory 210 and the CPU memory 220 may be physical memory that back the UVM. When the GPU performs a page access to the GPU memory 210 to obtain the page 2 232, a fault may occur if the page 2 232 does not exist in the GPU memory 210 at the time of the access. The page 2 232 may or may not exist in the GPU memory 210 or the CPU memory 220 at any given time because it may be transferred, as needed, between the CPU memory 220 and the GPU memory 210 through page migration.

GPU hardware and CPU software may communicate with each other to perform the fault and migration process. For example, device drivers (e.g., a host memory driver, a GPU driver, etc.) and memory drivers/managers may cooperate to manage faults and page migrations. A fault-based operation may allow flexible handling of various situations. However, a fault-based task may be handled through a complex internal operation process of the UVM. Since these internal UVM operations cause heavy, if not continuous, communication between hardware and software, they may have a significant performance overhead.

The UVM may have performance limitations due to its fault-based architecture. Communication (e.g., page migration) between the CPU and the GPU may be performed through peripheral component interconnect express (PCIe). PCIe may have a very slow physical speed compared to high bandwidth memory (HBM). Significant slowdowns may occur when pages are migrated between the CPU and GPU ("CPU" and "GPU", where the context suggests, are sometimes used herein as shorthand to refer to CPU memory and GPU memory). Fault handling itself may have a large processing overhead, aside from the overhead of actually migrating pages. Complex processes may be required for fault handling, and continuous communication between the GPU hardware and CPU software may be performed. For example, multiple layers of memory/location de-referencing may be needed for handling a fault.

Performance degradation may be even greater when GPU oversubscription occurs. GPU oversubscription occurs when a working set (working data) of a program is greater than the GPU memory 210. In the UVM, the GPU may select and migrate a portion of originally populated data blocks from the GPU memory 210 to the CPU memory 220 in order to secure (make available) physical memory space in the GPU memory 210. GPU oversubscription may incur additional fault handling overhead and data migration costs and may cause significant performance degradation. Large scale DNN models may have very large working set sizes, which may lead to GPU oversubscription within the UVM.

Figure 3:
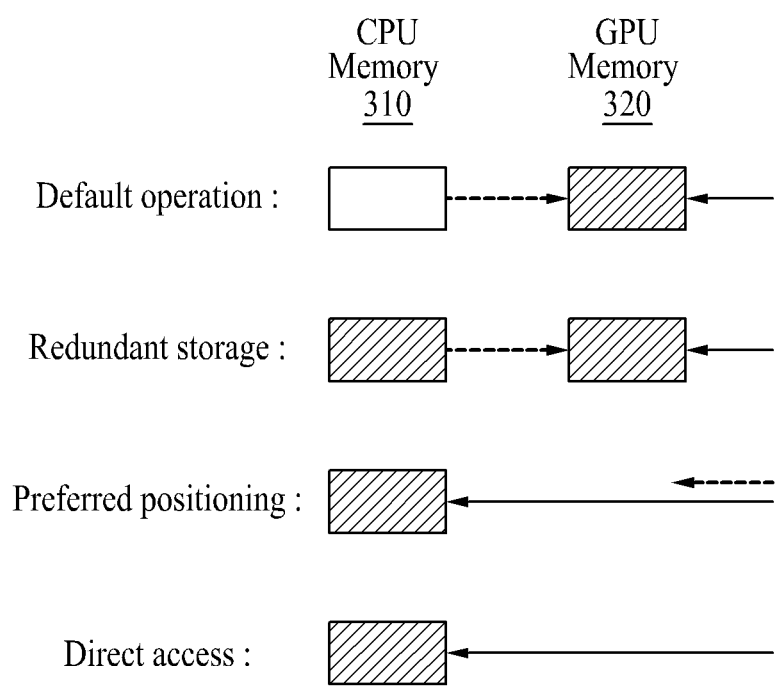
FIG. 3 illustrates example control operations of a UVM, according to one or more embodiments.

FIG. 3 illustrates example control operations of a UVM, according to one or more embodiments. To improve the performance of UVM migration, a user (or user space process/thread) may be provided with a control function (e.g., callable within code) that assigns various characteristics to UVM data blocks. The control function may include a redundant storage function, a preferred positioning function, and a direct access function. The control functions may allow deep learning frameworks to operate effectively.

When no control function is associated with a page operation, for example, a default operation may be on-demand paging. When a page fault occurs in a device (e.g., a GPU memory 320) in a situation where the default operation is applicable (e.g., no explicit control function characteristic applies to the page fault), migration from another device (e.g., a CPU memory 310) possessing the corresponding page to the device (e.g., the GPU memory 320) in which the page fault has occurred may be performed.

According to the redundant storage function, redundant storage, rather than migration, may be performed in response to a page fault. According to the redundant storage function, data may be redundantly stored in multiple devices. According to the redundant storage function, additional migration is not required, so performance may be improved accordingly.

According to the preferred positioning function, when a device (e.g., the CPU memory 310) is designated as a preferred position of a predetermined block, the corresponding block may reside in the device as much as possible in the course of memory management. A characteristic according to a preferred position may be assigned to data for which locality is important. Preferred positioning may also be referred to herein as pinning.

According to the direct access function, when a predetermined device accesses a predetermined UVM data block, data access may be performed through direct mapping instead of migration.

Previous UVM migration policy has operated without considering the characteristics of a DNN model. During training of a DNN model, an operation of the GPU memory 320 may exhibit very stable, repeatable, and predictable characteristics. The learning of the DNN model may be a process of minimizing loss to a target. The DNN model may have a fixed number of layers, a fixed number of learning parameters, and the like. The same task may be performed iteratively to improve the accuracy of the learning parameters. Memory characteristics such as the number of memory blocks generated in a learning/training iteration, an order in which the blocks are generated, and a life cycle of the blocks may be the same from one learning/training iteration to the next. For example, predetermined UVM data blocks of the DNN model may not be continuously used during learning, but may be used again after a long time has elapsed after the generation of the UVM data blocks. When the UVM data blocks occupy the GPU memory 320, free space of the GPU memory 320 may decrease, and thus the possibility of oversubscription may increase. When the UVM data blocks are migrated out of the GPU memory 320 to the CPU memory 310 in advance, and then migrated back to the GPU memory 320 right before actual use, the average free space of the GPU memory 320 over time may increase and performance may be improved accordingly.

Also, according to previous UVM migration policy, migration may be performed without considering the GPU state at all. When the migration policy is designed considering only the characteristics of the DNN model and without considering the GPU state, performance limitations may appear. For example, when a required amount of memory for the DNN model corresponding to a learning target is substantial, a situation may arise in which oversubscription cannot be avoided even if multiple migration policies are performed. In this example, due to oversubscription, data eviction and migration policies may use PCIe at the same time. When this happens, a bottleneck may be formed in the PCIe, and performance may degrade significantly. Therefore, performance may be improved when a migration policy is configured to consider the state of the GPU memory 320 and the current PCIe bandwidth.

Figure 4:
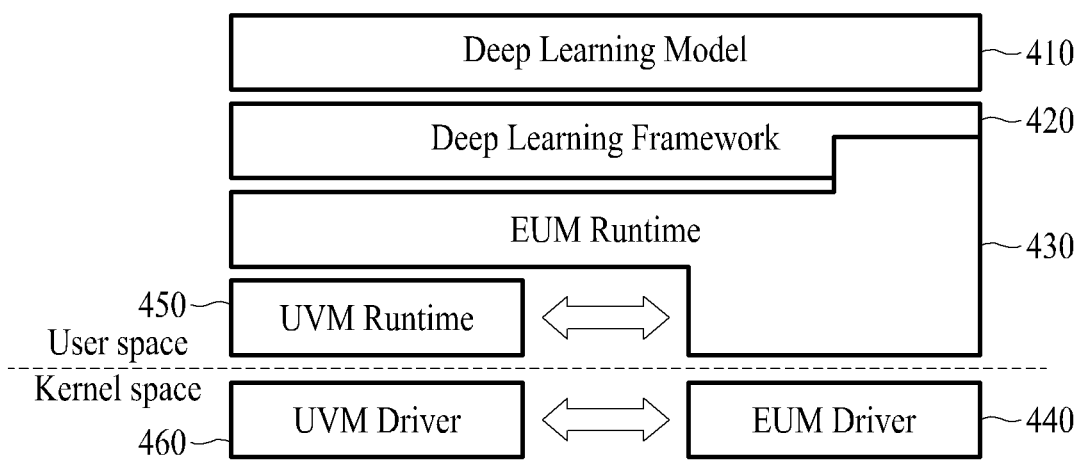
FIG. 4 illustrates an example of a layered structure of a kernel space and a user space to which an extended unified memory (EUM) runtime and an EUM driver are added, according to one or more embodiments.

FIG. 4 illustrates an example of a layered structure of a kernel space and a user space to which an extended unified memory (EUM) runtime and an EUM driver are added, according to an embodiment.

In previous UVM storage stacks (storage structure), a UVM driver 460 operates in kernel space, and a UVM runtime 450, a deep learning framework 420, and a deep learning model 410 operate in user space. The UVM runtime 450 may be an existing component (e.g., from NVIDIA). The UVM Driver 460 may also be an existing component, e.g., a kernel module from NVIDIA. In an example, an EUM runtime 430 may be added to user space, and an EUM driver 440 may be added to kernel space. The EUM runtime 430 may be connected to the deep learning framework 420 to collect information on UVM data blocks of the deep learning framework 420 and operate (and manage) a migration policy. The EUM driver 440 (which may also be a kernel module) may collect information on current UVM GPU memory state and deliver the information to the EUM runtime 430 to help the EUM runtime 430 determine/manage the migration policy. The EUM runtime 430 and the EUM driver 440 may call desired functions through mutual communication with the existing UVM runtime 450 and the UVM driver 460. For example, the EUM runtime 430 may invoke functions through an application programming interface (API) exposed by the UVM runtime 430 and the EUM driver 440 may invoke functions of an API exposed by the UVM driver 460. As a structure in which the EUM runtime 430 and the EUM driver 440 are newly added is used, modification of existing software may be minimized. This structure may be applied to various UVM software stacks and may provide excellent compatibility and scalability.

According to previous methods, the deep learning framework 420 and the UVM system are independent objects and may not directly share information with each other or cooperate for memory management. Also, the deep learning framework 420 may have no information about the state of the UVM GPU. For example, with previous methods, the deep learning framework 420 may train of a DNN model even when GPU oversubscription occurs. Therefore, when the deep learning framework 420 considers the state of the UVM memory when determining whether or how to migrate various data, accurate and efficient policy execution may be achieved.

In an example, weight parameter pinning (i.e., fixing or preferred positioning) may be performed. According to weight parameter pinning, weight parameters may be pinned to a main processor memory (e.g., CPU memory) of a main processor (e.g., CPU). With pinning, weight parameters may be fixedly stored in the main processor memory. Preferred positions of the weight parameters may be assigned to the main processor memory through the preferred positioning function. Pinning may prevent or inhibit a portion of memory from being migrated out of a pinned position or device. Regarding the direct access function, when a coprocessor (e.g., GPU) has to use a weight parameter, the weight parameter may be loaded directly into a cache memory of the coprocessor instead of being migrated from the main processor memory to the coprocessor memory (e.g., GPU memory). PCIe may be used for direct access. The coprocessor may access a weight parameter in the main processor memory through direct access.

Recently, transformer-based models are widely used in the field of artificial intelligence (AI). In order to reduce the learning time of models including transformers, a bit precision of weight parameters may be temporarily lowered during learning optimization (e.g., a quantization technique may be used). For example, a 32-bit floating point (FP) representation may be temporarily lowered to a 16-bit FP representation. In this example, a 32-bit FP representation and a 16-bit FP representation may coexist in a memory space. GPU memory space may be further used to improve learning speed.

The weight parameters of the DNN model may be used in forward state, backward state, and optimization state (in particular, in the case of a transformer-based model). The weight parameters may correspond to one of the most reused UVM data blocks in the DNN model. When GPU oversubscription occurs, a swap in-out phenomenon with respect to weight parameters may occur whenever weight parameters are required. For example, as various processes use the shared GPU memory, a block of weights of the DNN model might be swapped out after each use (due to other processes using the GPU memory) and the block of weights may need to be swapped back in for each next use when a process of the DNN model becomes active. When such a swap in-out phenomenon occurs, a large overhead may be induced because fault-based swap in-out is continuously performed. With weight parameter pinning, weight parameters are pinned to the main processor memory (or another memory resource backing the UVM, as the case may be), and when a UVM data block of a corresponding weight parameter is required by a coprocessor, the corresponding UVM data block may be accessed through direct mapping (also referred to as direct memory access (DMA), e.g., PCIe DMA). With weight parameter pinning, GPU memory space previously occupied by weight parameters may be additionally secured (e.g., prevented or restrained from being swapped out). Accordingly, the number of faults and the number of swapped in/out UVM data blocks may be reduced, and overall learning speed may be improved. The same technique and benefits may apply to weights of a neural network when performing inference.

In an example, prefetching of a UVM data block may be performed. When training a DNN model, a dynamic migration from the coprocessor memory (e.g., GPU memory) of the coprocessor (e.g., GPU) to the main processor memory (e.g., CPU memory) of the main processor (e.g., CPU) may be performed according to a prefetch policy. The training of large DNN models may require a significant amount of GPU memory. Here, most of the memory space may be occupied by intermediate results. The intermediate results may include an intermediate operation results. For each DNN layer, a corresponding intermediate operation result (e.g., intermediation operation results M described with reference to FIGS. 5 and 6) may be generated in the process of generating a corresponding layer output (e.g., output data yi described with reference to FIGS. 5 and 6) and a corresponding temporary result. The intermediate results may occupy up to 80% of the entire learning memory, depending on the model.

According to the prefetch operation, output data of each intermediate layer (result data) may be prefetched. The layer outputs may be generated during a forward operation and may be reused in a backward operation. Accordingly, there may be significant delay from the time output data is generated by an initial layer to the time when the output data is used again in the backward process. Therefore, the layer output (e.g., output data of the initial layer) may be prefetched from the coprocessor memory (e.g., GPU memory) into the main processor memory, and may be prefetched from the main processor memory into the coprocessor memory again when the backward operation is performed. According to the above-described prefetch operation, GPU memory space may be additionally secured and performance may be improved.

In an example, a pinning operation and/or a prefetch operation may be performed according to a UVM memory state. Status information on the oversubscription of the coprocessor memory may be continuously monitored, and a free space of the coprocessor memory and a migration status of a swap in-out may be identified. When learning of the DNN model is performed, whether or not to prefetch the layer output may be determined based on such information. An output prefetch condition used to determine whether to perform prefetching may be defined. For example, status information on oversubscription in the coprocessor memory may be continuously monitored, and a free space of the coprocessor memory and a migration status of a swap in-out may be identified.

When learning/training of the DNN model is performed, whether or not to prefetch the layer output may be determined based on such information. For example, when it is determined that there is not enough free space in the coprocessor memory, prefetching of the layer output may be performed. When GPU oversubscription occurs too often, the determination on whether to perform prefetching may be suspended since prefetching may burden the PCIe bandwidth. When GPU oversubscription is determined to end, prefetching condition-checking may resume. Through the prefetch policy of the layer output (where such policy considers the state of the coprocessor memory), the learning process of the DNN model may be optimized and the learning speed may be improved.

Figure 5:
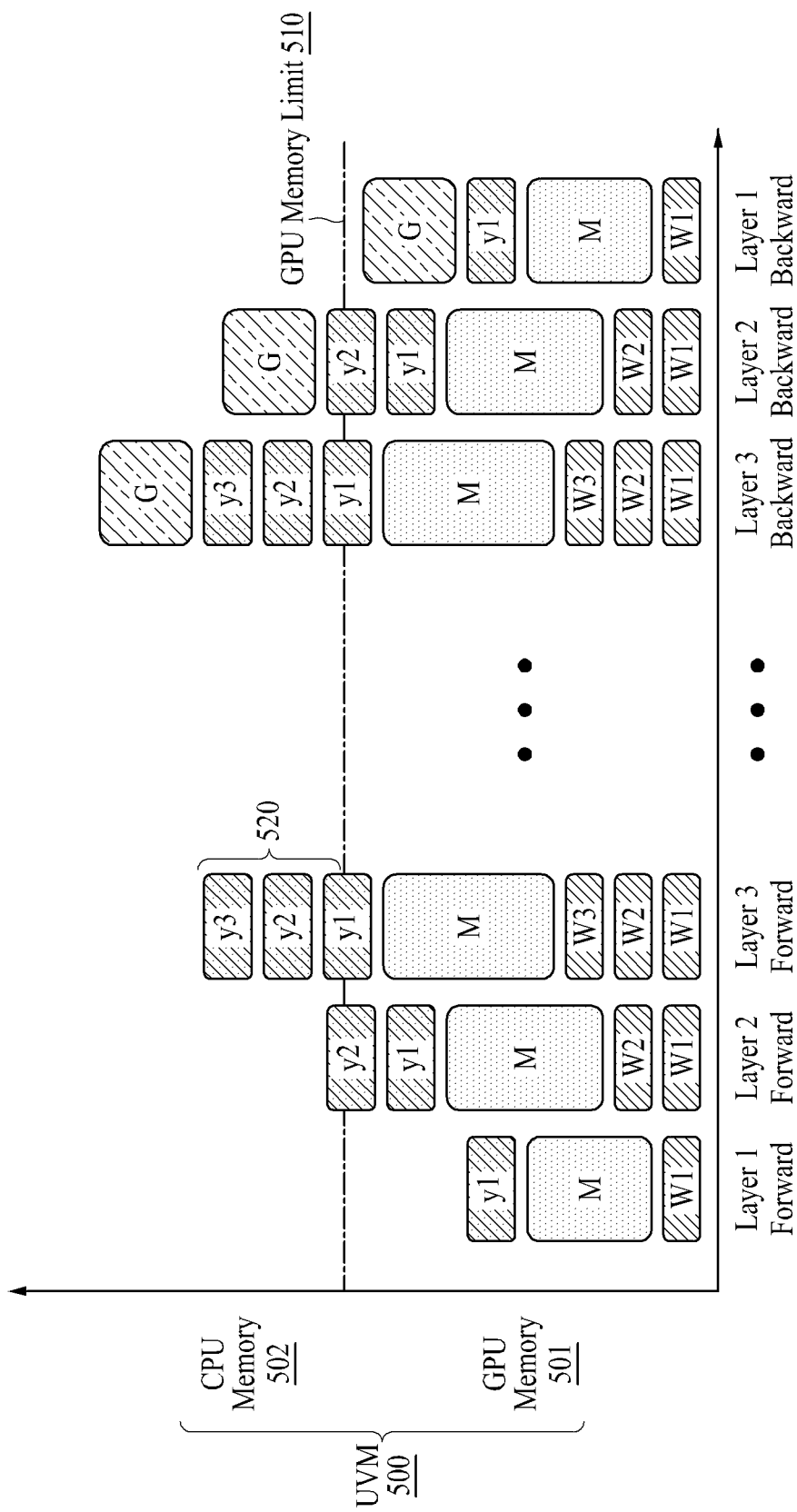
FIG. 5 illustrates an example scenario in which GPU oversubscription occurs according to the execution of a deep learning model, according to one or more embodiments.

FIG. 5 illustrates an example scenario in which GPU oversubscription occurs according to the execution of a deep learning model, according to one or more embodiments. Referring to FIG. 5, learning of a DNN model may be performed using a UVM 500 backed by a GPU memory 501 and a CPU memory 502. The GPU memory 501 and the CPU memory 502 may be physical memories. The CPU memory 502 may be the memory of a main processor (e.g., CPU or host memory), and the GPU memory 501 may be the memory of a coprocessor (e.g., GPU).

Learning of the DNN model may be performed in an order of a forward stage and a backward stage, although learning is not limited thereto. A forward operation for forward propagation may be performed in the forward stage, and a backward operation for backward propagation may be performed in the backward stage. Backward propagation may be performed based on an error calculated through forward propagation. In the process of backward propagation of the error, learning of the DNN model may be performed according to gradient descent.

In FIG. 5, Wi represents weight data of an i-th layer, yi represents output data of the i-th layer, M represents an intermediate operation result generated in the process of generating the output data of each layer, and G represents gradient data generated in a backward operation process of each layer. The weight data Wi, the output data yi, the intermediate operation result M, and the gradient data G may form UVM data blocks during the execution of the deep learning model. Properties of the UVM data blocks may be determined according to data types such as the weight data Wi, the output data yi, the intermediate operation result M, and the gradient data G. In general, the size of an intermediate operation result may increase as layers progress in the forward stage.

In FIG. 5, the horizontal axis represents time, and the vertical axis represents memory usage. GPU memory usage may increase as a learning process progresses and operations of a high number of layers are performed. Like the forward operation of Layer 3 of FIG. 5, the GPU memory usage may exceed a GPU memory limit 510 due to an operation result 520, and thus GPU oversubscription may occur. Note that the GPU Memory Limit shown in FIG. 5 may be a global limit, a memory limit of a partition of the GPU, a calculated limit, etc.

Figure 6:
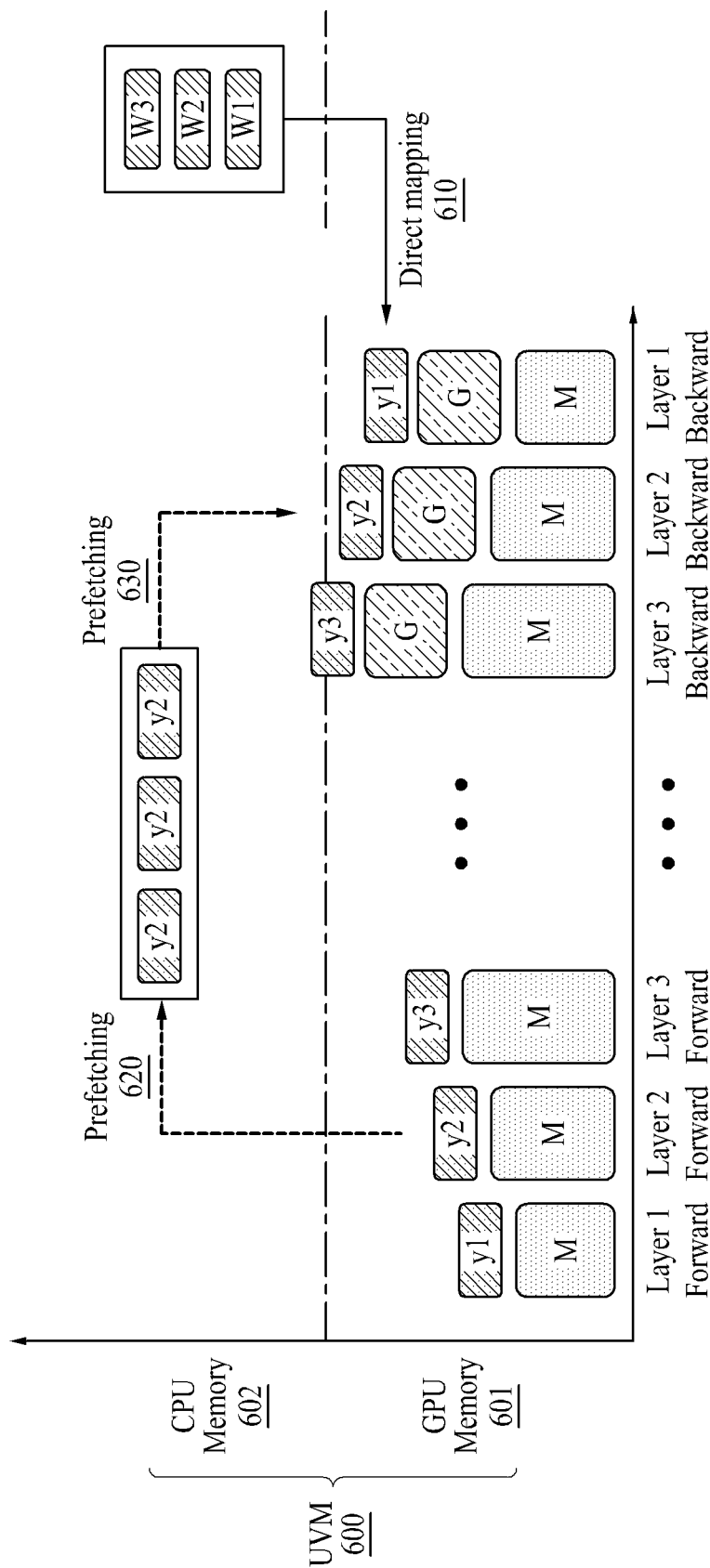
FIG. 6 illustrates an example of memory management through direct mapping and prefetching, according to one or more embodiments.

FIG. 6 illustrates an example of memory management through direct mapping and prefetching, according to an embodiment. The direct mapping and prefetching may be performed by associating characteristics (e.g. pinning and direct access) with various data blocks used in performing an operation (e.g., learning) of a DNN model. Referring to FIG. 6, learning of the DNN model may be performed using a UVM 600 backed by a GPU memory 601 and a CPU memory 602. In the learning process, direct mapping 610 of weight data Wi may be performed according to weight parameter pinning (based on pinning characteristics associated with weight-containing UVM data blocks). Also, prefetching 620 and 630 of output data yi may be performed, for example, in accordance with a prefetching policy. The probability of occurrence of GPU oversubscription may be reduced through the direct mapping 610 and prefetching 620 and 630.

The weight data Wi, the output data yi, the intermediate operation result M, and the gradient data G may be stored in UVM data blocks during the execution of the deep learning model. Memory-related properties (or characteristics) of these UVM data blocks may be determined (and associated therewith in the UVM system) according to data types such as the weight data Wi, the output data yi, the intermediate operation result M, and the gradient data G. For weight parameter pinning of the weight data Wi and prefetching 620 and 630 of the output data yi, properties/characteristics of the corresponding UVM data blocks may be determined (with respect to the DNN data they are storing) and may be used to provide UVM-based management of the data blocks while executing a deep learning model. The properties may be determined in the process of collecting block information by an EUM runtime.

When a UVM data block corresponds to (contains) weight data Wi of the deep learning model, the corresponding UVM data block may have a preferred position characteristic (or pinning characteristic) associated therewith and may thereby be managed by the UVM system to be stored in the CPU memory 602 corresponding to the main processor memory through a pinning operation. The preferred position of the UVM data block of the weight data Wi may be designated as the CPU memory 602. Because the preferred position of the UVM data block of the weight data Wi is designated as the CPU memory 602, migration of the UVM data block containing the weight data Wi from the CPU memory 602 to the GPU memory 601 may be limited. The GPU memory 601 may be a coprocessor memory.

The UVM data block of the weight data Wi pinned in the CPU memory 602 may be used for forward and backward operations that are performed through the direct mapping 610. According to the direct mapping 610, the UVM data block containing the weight data Wi pinned in the CPU memory 602 may not be migrated from the CPU memory 602 to the GPU memory 601. According to the direct mapping 610, at least part of the UVM data blocks of the CPU memory 602 may be directly loaded therefrom into a cache memory of the GPU, and the GPU may perform operations of the deep learning model based on the at least part of the UVM data blocks loaded into the cache memory.

Regarding initiating weight pinning, GPU oversubscription may be monitored (e.g., when weight parameter pinning is available), and when GPU oversubscription is predicted to occur, the UVM data block of the weight data Wi may be pinned in the CPU memory 602. GPU oversubscription may be easily predicted based on the iterative and consistent nature of DNN model learning. When the weight data Wi is required in the learning process, the UVM data block of the weight data Wi may be accessed through the direct mapping 610 (e.g., to GPU cache) instead of being migrated from the CPU memory 602 to the GPU memory 601. In this way, additional space may be secured (kept available) in the GPU memory 601 as the UVM data block of the weight data Wi is pinned in the CPU memory 602. Accordingly, the probability of occurrence of GPU oversubscription may be reduced and the learning speed may be improved. When GPU oversubscription is predicted to not occur, the pinning operation of the weight parameter may not be performed.

Based on a state of the GPU memory 601 of the UVM 600, the prefetching 620 and 630 of the UVM data blocks of the output data yi of each layer may be performed. The prefetching 620 and 630 may be performed based on an output prefetch condition (e.g., specified in a prefetch policy). The output-data prefetch condition may include at least part of a position of each layer in the DNN model and usage of the GPU memory 601 in the learning process of the DNN model. The position of each layer in the DNN model may be determined according to the value of i. A layer having a small i value may be classified as an initial layer. Whether an i-th layer is an initial layer may be determined through a predetermined threshold set for the value of i (e.g., in the prefetch policy).

In an example, it may be determined when GPU oversubscription may be prevented through the action of prefetching 620 of a UVM data block of the output data yi, and when so determined the UVM data block of the output data yi may be prefetched 620. In addition, when the i-th layer is determined to correspond to the initial layer, in response the prefetching 630 may also be performed. The UVM data block of the output data yi according to a forward operation of a back-end layer may be immediately used for a backward operation. Therefore, an additional space of the GPU memory 601 secured through the prefetching 620 of the UVM data block of the output data yi according to the forward operation of the back-end layer may not be maintained for long, and the prefetching 630 of the UVM data block of the output data yi may be performed immediately according to the backward operation requiring the UVM data block of the output data yi. Since the effect of memory space generation according to the prefetching 620 and 630 may not be significant, in some implementations (or in some prefetch policies) the prefetching 620 and 630 may be performed on a limited basis, e.g. for only the initial layer or layers close to the initial layer.

A migration policy may not be performed even when GPU oversubscription occurs very often. This is because the PCIe bandwidth usage is high, and latency due to unnecessary migration may occur.

When the output data yi is generated in the forward process, the UVM data block of the output data yi may be prefetched 620 from the GPU memory 601 into the CPU memory 602. In the backward process, the UVM data block of the output data yi may be prefetched 630 from the CPU memory 602 into the GPU memory 601, which may be done immediately before the backward operation of the i-th layer is performed. A parameter of the i-th layer may be updated using the UVM data block of the output data yi of the GPU memory 601. The prefetching 620 and 630 may be performed without a separate fault. Through the direct mapping 610 and the prefetching 620 and 630, the free space of the GPU memory 601 may be maximized and performance may be improved.

Figure 7:
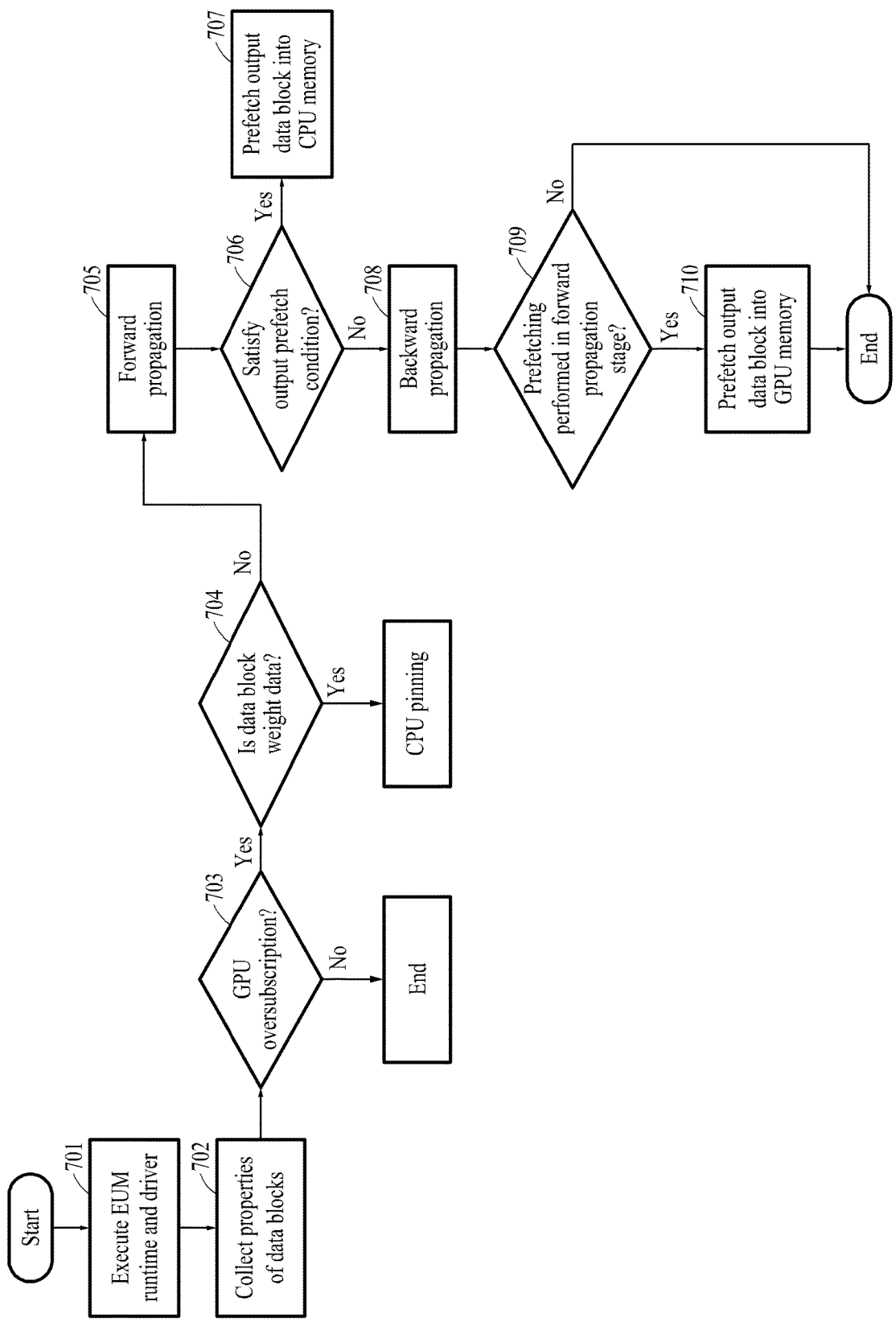
FIG. 7 illustrates an example UVM management method, according to one or more embodiments.

FIG. 7 illustrates an example UVM management method, according to one or more embodiments. Referring to FIG. 7, an EUM runtime and EUM driver may be executed in operation 701, and the properties of UVM data blocks may be collected thereby in operation 702. The EUM runtime and EUM driver may operate together with arbitrary applications. The EUM runtime may collect the properties of the UVM data blocks of a deep learning framework and transmit the properties to the EUM driver. The properties of the UVM data blocks may include weight data, output data, intermediate operation results, and gradient data, as in each block of FIG. 5. In operation 702, the size of each UVM data block and a layer number (i.e., layer index, e.g., the value of i) of a layer in which the UVM data block of each property is generated may be further collected. The collected properties, sizes, and layer numbers may be stored in association with identifiers of the corresponding UVM data blocks, thus allowing the UVM data blocks to be managed according to their properties and the like.

In operation 703, the occurrence of GPU oversubscription may be predicted. When it is predicted that GPU oversubscription will occur, weight parameter pinning and output prefetching may be performed through operations 704 to 710. When it is predicted that GPU oversubscription will not occur, weight parameter pinning and output prefetching may not be performed. The learning of the DNN model has a constant iterative nature, so the possibility of GPU oversubscription may be easily predicted.

In operation 704, during processing of the DNN model, it may be determined, from the collected properties previously associated with the UVM data blocks of the DNN model, whether a UVM data block corresponds to weight data. Each UVM data block corresponding to weight data may be pinned in the CPU memory. In operation 705, forward propagation may begin. A forward operation may be performed through direct mapping with respect to the weight data pinned in the CPU memory. In the direct mapping process, the weight data may be directly loaded into cache memory without migration.

In operation 706, it may be determined whether an output prefetch condition is satisfied. The output prefetch condition may include a layer condition about at least part of a position of each layer in the DNN model (e.g., a condition selecting some layers and not others) and a usage condition of the GPU memory in the learning process of the DNN model (e.g., an oversubscription condition). When the prefetch condition is satisfied for an output UVM data block, the output UVM data block may be prefetched into the CPU memory in operation 707. For example, when a layer is an initial layer and memory usage that may avoid GPU oversubscription through the current prefetching is provided, output data of the layer may be prefetched into the CPU memory.

Backward propagation may begin in operation 708. In operation 709, it may be determined whether prefetching has been performed in the forward propagation stage. When it is determined that prefetching has been performed in the forward propagation stage, the output UVM data block may be prefetched into the GPU memory in operation 710. The output UVM data block may be prefetched into the GPU memory when needed. For example, the UVM data block of the output data yi may be prefetched into the GPU memory immediately before the backward operation for the i-th layer is performed.

Figure 8:
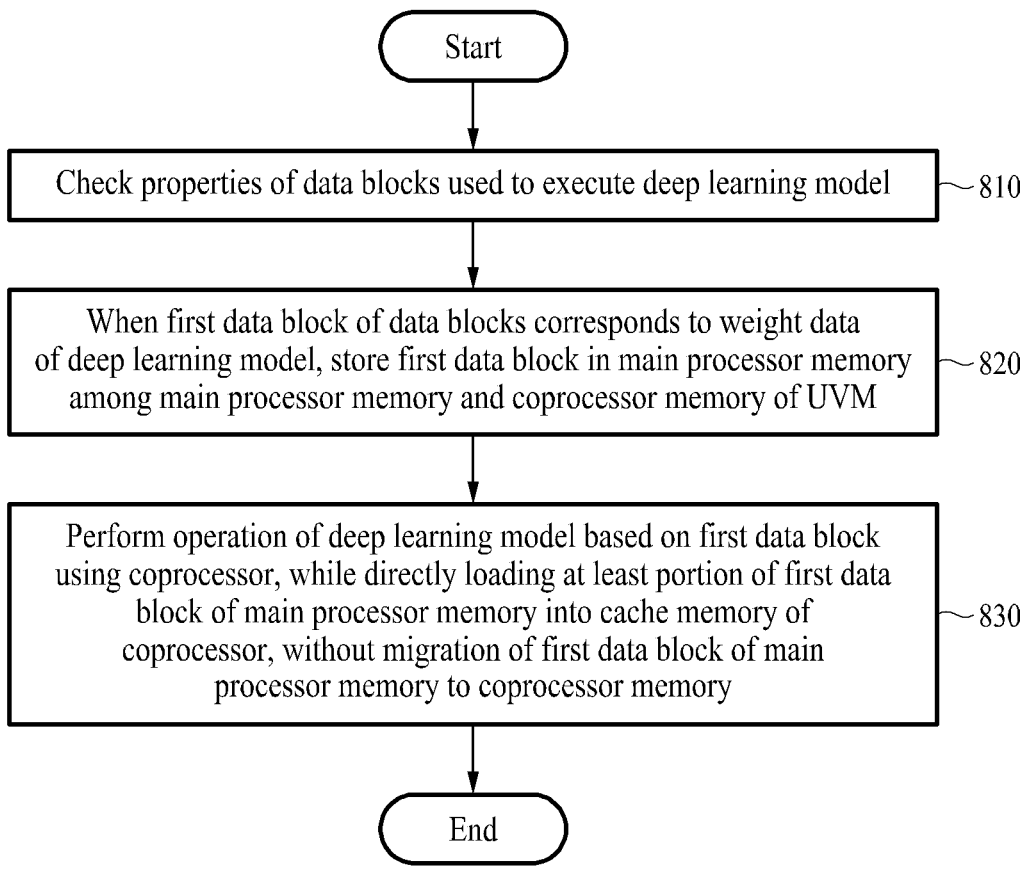
FIG. 8 illustrates an example UVM management method, according to one or more embodiments.

FIG. 8 illustrates an example UVM management method, according to one or more embodiments. Referring to FIG. 8, in operation 810, an electronic device may check the properties of UVM data blocks used to execute a deep learning model, in operation 820, when a first UVM data block of the UVM data blocks corresponds to weight data of the deep learning model, the electronic device may store the first UVM data block in a main processor memory among the main processor memory and a coprocessor memory of a UVM, and in operation 830, the electronic device may perform an operation of the deep learning model based on the first UVM data block using a coprocessor while directly loading at least a portion of the first UVM data block of the main processor memory into a cache memory of the coprocessor, without migration of the first UVM data block of the main processor memory to the coprocessor memory.

When the first UVM data block corresponds to the weight data of the deep learning model, the electronic device may designate a preferred position of the first UVM data block to the main processor memory. As the preferred position of the first UVM data block is designated to the main processor memory, migration of the first UVM data block to the coprocessor memory may be limited during processing of the deep learning model.

In a forward propagation stage of the deep learning model, when the electronic device executes a first layer of the deep learning model to determine a second UVM data block corresponding to an output of the first layer and prefetches the second UVM data block into the main processor memory, and accordingly, when the second UVM data block is prefetched into the main processor memory, in a backward propagation stage of the deep learning model, the electronic device may prefetch the second UVM data block from the main processor memory into the coprocessor memory and update the parameters of the first layer using the second data block. The electronic device may prefetch the second UVM data block as oversubscription of the coprocessor is predicted to occur.

The electronic device may determine whether to prefetch the second UVM data block into the main processor memory based on an output prefetch condition. The output prefetch condition may include at least part of a position of the first layer in the deep learning model and usage of the coprocessor memory in the learning process of the deep learning model.

The electronic device may perform operations 820 and 830 based on oversubscription of the coprocessor being predicted to occur.

The main processor may correspond to a CPU, and the coprocessor may correspond to a GPU.

The properties of the UVM data blocks may be checked by an EUM runtime provided separately from a UVM runtime and UVM driver of a UVM.

In addition, the description provided with reference to FIGS. 1 to 7, 9, and 10 may generally apply to the UVM management method of FIG. 8.

Figure 9:
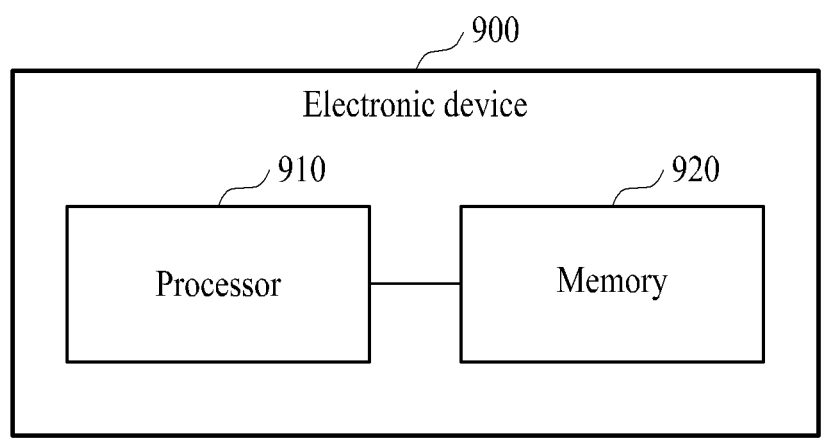
FIG. 9 illustrates an example configuration of an electronic device, according to one or more embodiments.

FIG. 9 illustrates an example configuration of an electronic device, according to one or more embodiments. Referring to FIG. 9, an electronic device 900 may include a processor 910 and a memory 920. The memory 920 may be connected to the processor 910 and store instructions executable by the processor 910, data to be computed by the processor 910, or data processed by the processor 910. The memory 920 may include a non-transitory computer-readable medium, for example, a high-speed random-access memory (RAM), and/or a non-volatile computer-readable storage medium (e.g., at least one disk storage device, a flash memory device, and other non-volatile solid-state memory devices).

The processor 910 may execute the instructions to perform the operations described with reference to FIGS. 1 to 8 and 10. For example, the processor 910 may check the properties of UVM data blocks used to execute a deep learning model, store the first UVM data block in a main processor memory among the main processor memory and a coprocessor memory of a UVM when a first UVM data block of the UVM data blocks corresponds to weight data of the deep learning model, and perform an operation of the deep learning model based on the first UVM data block using a coprocessor while directly loading at least a portion of the first UVM data block of the main processor memory into a cache memory of the coprocessor without migration of the first UVM data block of the main processor memory to the coprocessor memory (non-cache memory). The processor 910 may correspond to a main processor (e.g., CPU), and the memory 920 may correspond to a main processor memory (e.g., CPU memory). The processor 910 may implement at least part of a deep learning framework, an EUM runtime, an EUM driver, a UVM runtime, and a UVM driver. The electronic device 900 may further include a coprocessor memory (e.g., GPU or NPU) in addition to the processor 910. The memory 920 may form a UVM together with a GPU memory or NPU memory. In addition, the description provided with reference to FIGS. 1 to 8 and 10 may generally apply to the electronic device 900.

Figure 10:
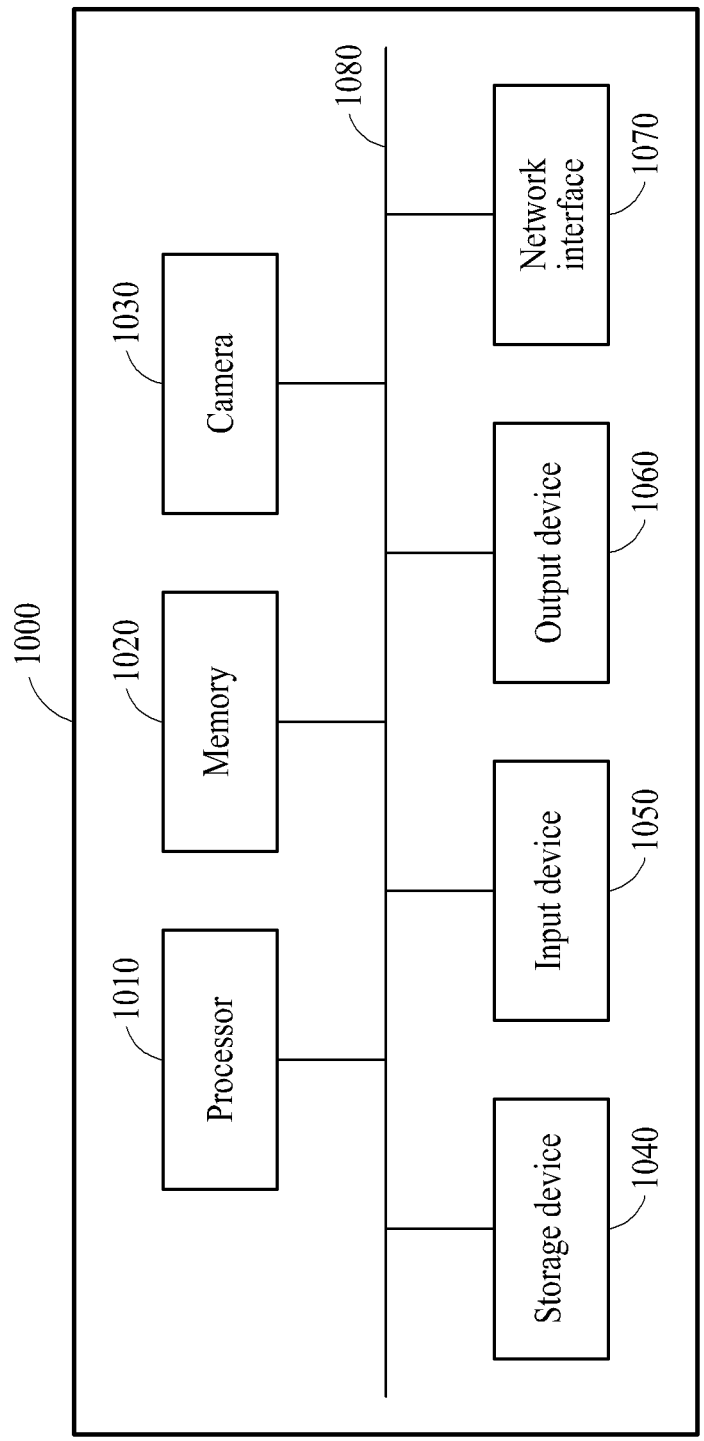
FIG. 10 illustrates an example configuration of an electronic device, according to one or more embodiments.

FIG. 10 illustrates an example configuration of an electronic device, according to one or more embodiments. Referring to FIG. 10, an electronic device 1000 may include a processor 1010, a memory 1020, a camera 1030, a storage device 1040, an input device 1050, an output device 1060, and a network interface 1070 that may communicate with each other through a communication bus 1080. For example, the electronic device 1000 may be implemented as at least a part of a mobile device such as a mobile phone, a smart phone, a personal digital assistant (PDA), a netbook, a tablet personal computer (PC) or a laptop computer, a wearable device such as a smart watch, a smart band or smart glasses, a computing device such as a desktop or a server, a home appliance such as a television (TV), a smart TV or a refrigerator, a security device such as a door lock, or a vehicle such as an autonomous vehicle or a smart vehicle. The electronic device 1000 may include, structurally and/or functionally, the electronic device 900 of FIG. 9.

The processor 1010 may execute functions and instructions to be executed in the electronic device 1000. For example, the processor 1010 may process instructions stored in the memory 1020 or the storage device 1040. The processor 1010 may perform one or more of the operations described above with reference to FIGS. 1 to 9. The memory 1020 may include a computer-readable storage medium or a computer-readable storage device. The memory 1020 may store instructions to be executed by the processor 1010 and may store information associated with software and/or applications when the software and/or applications are being executed by the electronic device 1000.

The camera 1030 may capture a photo and/or record a video. The storage device 1040 may include a computer-readable storage medium or computer-readable storage device. The storage device 1040 may store a greater amount of information than the memory 1020 and store the information for a long period of time. For example, the storage device 1040 may include a magnetic hard disk, an optical disc, a flash memory, a floppy disk, or other non-volatile memories known in the art.

The input device 1050 may receive an input from a user through traditional input methods such as a keyboard and a mouse, and through new input methods such as a touch input, a voice input, and an image input. For example, the input device 1050 may include a keyboard, a mouse, a touch screen, a microphone, or any other device that detects an input from the user and transmits the detected input to the electronic device 1000. The output device 1060 may provide an output of the electronic device 1000 to the user through a visual, auditory, or haptic channel. The output device 1060 may include, for example, a display, a touch screen, a speaker, a vibration generator, or any other device that provides an output to the user. The network interface 1070 may communicate with an external device through a wired or wireless network.

The computing apparatuses, the electronic devices, the processors, the memories, the displays, the information output system and hardware, the storage devices, and other apparatuses, devices, units, modules, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method of managing a unified virtual memory (UVM) that is backed by a main processor memory and a coprocessor memory, the method comprising:
    checking properties of data blocks of the UVM used to execute a deep learning model;
    based on a first of the data blocks storing weight data of the deep learning model, storing the first data block in the main processor memory among the main processor memory and the coprocessor memory; and
    performing an operation of the deep learning model based on the first data block using a coprocessor while directly loading at least a portion of the first data block from the main processor memory into a cache memory of the coprocessor without migration of the first data block from the main processor memory to the coprocessor memory.

2. The method of claim 1, further comprising:
    based on the first data block storing the weight data of the deep learning model, designating a preferred backing memory of the first data block to be the main processor memory.

3. The method of claim 2, wherein, based on backing memory of the first data block being designated as the main processor memory, the migration of the first data block to the coprocessor memory is inhibited or prevented.

4. The method of claim 1, further comprising:
in a forward propagation stage of the deep learning model, executing a first layer of the deep learning model to determine a second data block of the UVM storing an output of the first layer;
prefetching the second data block into the main processor memory;
based on the second data block being prefetched into the main processor memory, in a backward propagation stage of the deep learning model, prefetching the second data block from the main processor memory into the coprocessor memory; and
updating a parameter of the first layer using the second data block.

5. The method of claim 4, further comprising:
determining whether to prefetch the second data block into the main processor memory based on an output prefetch condition.

6. The method of claim 5, wherein the output prefetch condition comprises: a condition of a position of the first layer in the deep learning model or a condition of usage of the coprocessor memory in a learning process of the deep learning model.

7. The method of claim 4, wherein the prefetching of the second data block is performed at least partly based on a prediction of an oversubscription condition occurring with respect to the coprocessor memory.

8. The method of claim 1, wherein the storing of the first data block in the main processor memory and the performing of the operation of the deep learning model while directly loading the at least a portion of the first data block into the cache memory from the coprocessor memory are performed in response to an occurrence of oversubscription of the coprocessor memory being predicted.

9. The method of claim 1, wherein the main processor comprises a central processing unit (CPU), and the coprocessor comprises a graphic processing unit (GPU).

10. The method of claim 1, wherein the checking of the properties of the data blocks is performed by an extended unified memory (EUM) runtime provided separately from a UVM runtime and UVM driver that manage and provide the UVM.

11. An electronic device, comprising:
one or more processors; and
a memory storing instructions configured to cause the one or more processors to:
check properties of data blocks used to execute a deep learning model, the data blocks comprising blocks of a unified virtual memory (UVM) backed by a main processor memory and by a coprocessor memory;
in response to a first of the data blocks storing weight data of the deep learning model, store the first data block in the main processor memory among the main processor memory and the coprocessor memory; and
perform an operation of the deep learning model based on the first data block using a coprocessor while directly loading at least a portion of the first data block from the main processor memory into a cache memory of the coprocessor, without migration of the first data block of the main processor memory to the coprocessor memory.

12. The electronic device of claim 11, wherein the instructions are further configured to cause the one or more processors to:
based on the first data block storing the weight data of the deep learning model, designate a preferred backing memory of the first data block to the main processor memory.

13. The electronic device of claim 12, wherein, based on the backing memory of the first data block being designated as the main processor memory, the migration of the first data block to the coprocessor memory is inhibited or prevented.

14. The electronic device of claim 11, wherein the instructions are further configured to cause the one or more processors to:
in a forward propagation stage of the deep learning model, execute a first layer of the deep learning model to determine a second data block of the UVM storing an output of the first layer;
prefetch the second data block into the main processor memory;
based on the second data block being prefetched into the main processor memory, in a backward propagation stage of the deep learning model, prefetch the second data block from the main processor memory into the coprocessor memory; and
update a parameter of the first layer using the second data block.

15. The electronic device of claim 14, wherein the instructions are further configured to cause the one or more processors to:
determine whether to prefetch the second data block into the main processor memory based on an output prefetch condition, wherein
the output prefetch condition comprises a condition of a position of the first layer in the deep learning model and a condition of usage of the coprocessor memory in a learning process of the deep learning model.

16. The electronic device of claim 14, wherein the prefetching of the second data block is performed at least partly based on a prediction of an oversubscription of the coprocessor memory.

17. The electronic device of claim 11, wherein the instructions are further configured to cause the one or more processors to:
in response to an occurrence of oversubscription of the coprocessor memory being predicted, store the first data block in the main processor memory and perform the operation of the deep learning model by directly loading the at least a portion of the first data block into the cache memory of the coprocessor.

18. The electronic device of claim 11, wherein the main processor comprises a central processing unit (CPU), and the coprocessor comprises a graphic processing unit (GPU).

19. A method comprising:
executing a unified virtual memory (UVM) system that provides a UVM comprising a continuous virtual memory address space backed by a main processor memory and a coprocessor memory, wherein UVM data blocks allocated from the UVM are used for performing an operation of a neural network;
determining pinning properties of the UVM data blocks based on the performing of the operation of the neural network; and
while performing the operation of the neural network, based on the pinning properties of the UVM data blocks, pinning one or more of the UVM data blocks to the main processor memory and the coprocessor memory to prevent the pinned UVM data blocks, while pinned, from being migrated from the main processor memory and the coprocessor memory.

20. The method of claim 19, wherein the UVM system comprises a runtime component executing in user space and a driver component executing in kernel space, wherein the runtime component performs the determining of the pinning properties, and wherein the driver component performs the pinning.

\* \* \* \* \*